US012509329B2

(12) United States Patent
Meunier

(10) Patent No.: US 12,509,329 B2
(45) Date of Patent: Dec. 30, 2025

(54) MODULAR CUSTOMIZABLE LIFT

(71) Applicant: RAM Elevators & Lifts Inc., Edmonton (CA)

(72) Inventor: Richard A. Meunier, Edmonton (CA)

(73) Assignee: RAM Elevators & Lifts Inc., Edmonton (CA)

( * ) Notice: Subject to any disclaimer, the term of this patent is extended or adjusted under 35 U.S.C. 154(b) by 0 days.

(21) Appl. No.: 18/651,986

(22) Filed: May 1, 2024

(65) Prior Publication Data

US 2024/0367942 A1 Nov. 7, 2024

Related U.S. Application Data

(60) Provisional application No. 63/499,411, filed on May 1, 2023.

(51) Int. Cl.
*B66B 9/00* (2006.01)

(52) U.S. Cl.
CPC .................................... *B66B 9/00* (2013.01)

(58) Field of Classification Search
CPC ......... B66B 9/00; B66B 9/0853; B66B 9/187; B66B 9/08
See application file for complete search history.

(56) References Cited

U.S. PATENT DOCUMENTS 5,026,244 A * 6/1991 Dorn ...................... A61G 3/062 414/921
5,154,569 A * 10/1992 Eryou .................... A61G 3/067 187/244
5,322,408 A * 6/1994 Wooden .................... B66F 7/04 414/921
5,499,694 A * 3/1996 Dorn ......................... B64F 1/31 414/921
5,553,990 A * 9/1996 Kytola, Sr. ........... B66B 9/0853 414/592
5,901,812 A * 5/1999 Meunier ............... B66B 9/0853 414/921
6,523,647 B2 * 2/2003 Duplessis ............... B66F 11/04 187/244
6,640,934 B1 * 11/2003 Edwards ................... B66B 9/00 187/254
8,381,879 B2 * 2/2013 Griffin .................... B66F 11/00 254/362
10,597,274 B1 * 3/2020 Busuttil .................. B66F 11/04
2006/0048310 A1 * 3/2006 Tin ........................ E04F 11/002 14/2.4
2009/0266648 A1 * 10/2009 Asensio Bazterra ... B66B 9/187 187/270

(Continued)

FOREIGN PATENT DOCUMENTS

WO WO-2006122991 A1 * 11/2006 ............. B66B 9/022

*Primary Examiner* — Minh Truong
*Assistant Examiner* — Michelle M Mudwilder
(74) *Attorney, Agent, or Firm* — Bennett Jones LLP

(57) ABSTRACT

A modular lift system includes a lifting tower comprising a motor and drive components, for supporting, lifting and lowering a lift platform formed from a base platform which has a control wall side, a side opposite the control wall side, and a left side and a right side, and at least two platform extension assemblies configured to attach to one of the opposite side, left side and/or right side of the base platform.

7 Claims, 6 Drawing Sheets

(56) References Cited

U.S. PATENT DOCUMENTS

2013/0112504 A1* 5/2013 Zuercher .................. B66B 9/16
187/200
2013/0133982 A1* 5/2013 Graf ........................ B66B 9/187
187/239

* cited by examiner

MODULAR CUSTOMIZABLE LIFT

FIELD OF THE INVENTION

The present invention generally relates to a modular customizable lift, for example a lift installed to provide wheelchair access to a residence or business premises.

BACKGROUND

Lifts are provided in residential and commercial settings to provide wheelchair or alternate access to raised doorways or landings. A lift is different from an elevator, in that a lift requires constant pressure operation on both floor selection and call buttons, as opposed to automatic one-touch controls which are used in elevator systems.

When used for wheelchair access, lift configurations are regulated by safety regulations which impose certain dimensional requirements and safety features.

A lift must also be configured to match the direction of entry to and exit from the lift, which may be different in different installations. Thus, lift designs are typically custom manufactured for a particular installation.

SUMMARY OF THE INVENTION

The present disclosure relates to modular customizable lift, which may be conveniently modified to fit any installation. In some embodiments, the lift system comprises:

(a) a lifting tower comprising a motor and drive components, for supporting, lifting and lowering a lift platform comprising a base platform;

(b) wherein the base platform has a control wall side, a side opposite the control wall side, and a left side and a right side, wherein the lifting tower is attached to the control wall side of the platform;

(c) at least two platform extension assemblies wherein each assembly comprises two vertical posts and a horizontal extension plate; and (d) wherein each extension assembly is configured to attach to one of the opposite side, left side and/or right side of the base platform.

In another aspect, disclosed is a kit for assembling a lift platform having custom dimensions, comprising:

(a) a base platform having a control wall side, a side opposite the control wall side, and a left side and a right side;

(b) a plurality of platform extension assemblies having different dimensions, wherein each platform extension assembly comprises two vertical posts and a horizontal extension plate, and is configured to attach to one of the opposite side, left side and right side of the base platform to form the lift platform.

In another aspect, disclosed is a method of assembling a lift platform having desired dimensions, comprising the steps of:

(a) providing a base platform having a depth and a width; and (b) selecting and installing at least two platform extension assemblies to the base platform, each platform extension assembly chosen from a plurality of platform extension assemblies having different dimensions, to increase the depth and/or width of the lift platform to the desired dimensions.

In some embodiments, there are two platform extension assemblies installed on a right side and a left side, to provide a lift platform of a desired depth and with straight-through ingress and egress. In some embodiments, there are three platform extension assemblies to provide a lift platform of a desired depth and width and with a left turn or right turn ingress or egress.

Embodiments of the described invention may comprise any combination of elements or feature described herein.

BRIEF DESCRIPTION OF THE FIGURES

The accompanying drawings, which are incorporated herein and form a part of the specification, illustrate some, but not the only or exclusive, examples of embodiments and/or features.

DETAILED DESCRIPTION

Figure 1:
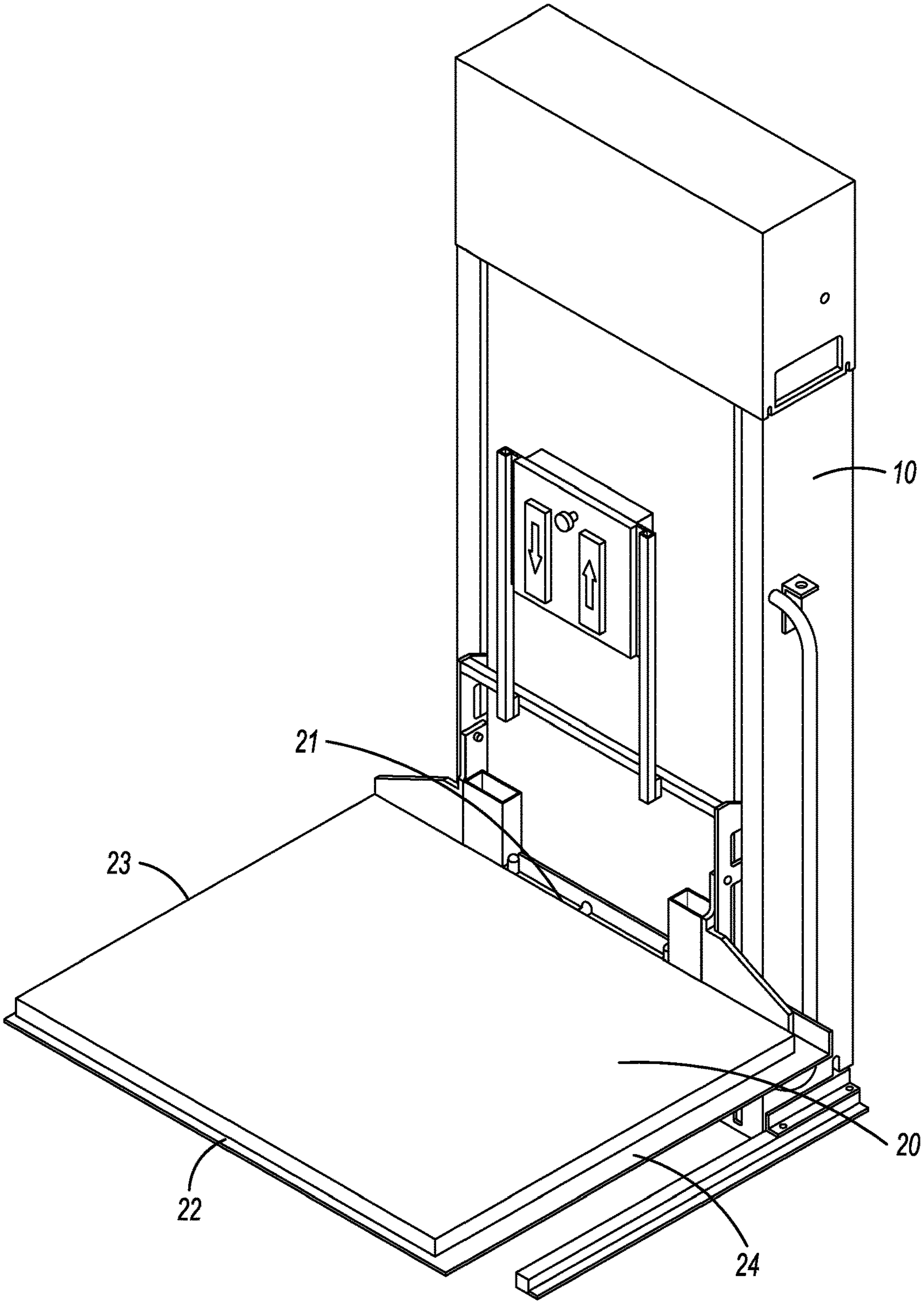
FIG. 1 is a perspective view of a lift tower and a base platform of one embodiment.

The present invention now will be described more fully hereinafter with reference to the accompanying drawings, in which some, but not all embodiments of the invention are exemplified. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

In this description, the directional prepositions of up, upwardly, down, downwardly, front, back, top, upper, bottom, lower, left, right and other such terms refer to the device as it is oriented and appears in the drawings. A lift is used to transport a user vertically and has horizontal ingress and egress from the lift platform. Conventional components of the invention are elements that are well-known in the prior art and will not be discussed in detail for this disclosure.

A lift will have an entrance ramp which connects to a walkway at a lower level, and an exit which connects to a walkway at a raised level. The entrance and exit sides may be different, with left turn, right turn or straight through routes. In some embodiments, the lift may have a single entrance/exit side, where the lift travels between different floors or stories of a building. Such an installation will typically have a vertical travel of 8 feet or greater, and may require that the lift be enclosed.

In embodiments described below, a base platform 20 will conventionally be square or rectangular, having four sides: a control wall side 21, a side 22 opposite the control wall side, and a left side 23 and a right side 24. In this context, “left” and “right” are determined as if a user was facing the control wall side 21. Thus, the lift may be configured for a “straight through” path, or a “right turn” path, or a “left turn” path, or in and out same side path by creating entrance and exit ramps through one, two or three of the three sides 22, 23, 24.

As exemplified in the Figures, disclosed is a lift system which comprises a conventional lifting tower 10 comprising a motor and drive components, for supporting, lifting and lowering a lift platform which comprises the base platform 20. The base platform 20 comprises a control wall side 21, an opposite side 22, and a left side 23 and a right side 24, and the lifting tower 10 is attached to the control wall side 21 of the platform 20.

In some embodiments, the lift platform comprises at least two platform extension assemblies 30, each comprising two or more vertical posts 32 and a horizontal extension plate 35, wherein each platform extension assembly is configured to attach to the opposite side, left side or right side of the base platform 20. In order to provide a lift platform of desired size and configuration, the platform extension assemblies are selected from a plurality of platform extension assemblies having different dimensions. A kit for installing a customized lift may comprise a plurality of pre-manufactured platform extension assemblies having different dimensions.

The platform extension assemblies may be bolted to the base platform with conventional bolts, or otherwise attached in a secure manner.

Once assembled, the lift may comprise at least one vertical side walls 36, selected from a plurality of walls having different dimensions.

The base platform 20 will have a desired or required basic horizontal dimensions. In one embodiment shown in FIG. 1, the base platform 20 has a width of 36" (as measured from the control wall side 21 to the opposite side 22) and a depth of 45" (as measured from the left side 23 to the right side 24). The depth and width of the assembled lift platform may then be increased from the base dimensions by installing a platform extension assembly on the desired side of the base platform.

In some embodiments, a platform extension assembly 30 comprises an assembly of the vertical posts 32 welded to the horizontal extension plate 35, and optionally a supporting horizontal member. Alternatively, the vertical posts 32 and the horizontal extension plates 35 may be separately installed. The horizontal extension plate 35 may simply be the same component as the vertical posts, for example square tubing having a width of 1.5". In other embodiments, the horizontal extension plate may have a substantial width, for example between 3" and 12". As used in this description, the width of a horizontal extension plate is the distance measured perpendicularly away from the base platform to which it is attached. The length of the horizontal extension plate is the distance between the vertical posts 32, which preferably matches the depth or width of the platform 20 to which it is attached.

In some embodiments, the platform extension vertical posts 32 are preferably made from square or rectangular tubing, such as metal tubing, and corner welded for structural strength. Where the horizontal extension plate 35 is sufficiently wide, it may require a supporting horizontal beam, which may comprise the same tubing as the vertical posts. A single platform extension assembly 30 may comprise at least a pair of spaced apart vertical posts 32, and may comprise more than two vertical posts to accommodate a desired exit or entrance configuration.

The lift system is modular in that platform extension assemblies 30 are provided in different sizes in order to create a lift platform of a desired size and configuration for a particular installation. For example, if the base platform is 36"×45" and the desired lift platform is 36"×48" with a straight through path between the left side and the right side, then two platform extension assemblies 30 which each have an extension plate 34 which is 1.5"×36" can be attached to the left side 23 and right side 24 respectively to create the desired lift platform. If the desired lift platform is 36"×54", then one extension plate may be 1.5"×36" while a second extension plate may be 7.5"×36". In this embodiment, the base platform may be combined with platform extension assemblies of different sizes in order to create a lift platform to fit a desired configuration.

The side or sides which is not an entrance or exit side will require a vertical side wall 36, which is attached between vertical posts 32 of the opposing platform extension assemblies 30. A top rail 33 may attach to the top of the vertical posts.

Figure 2:
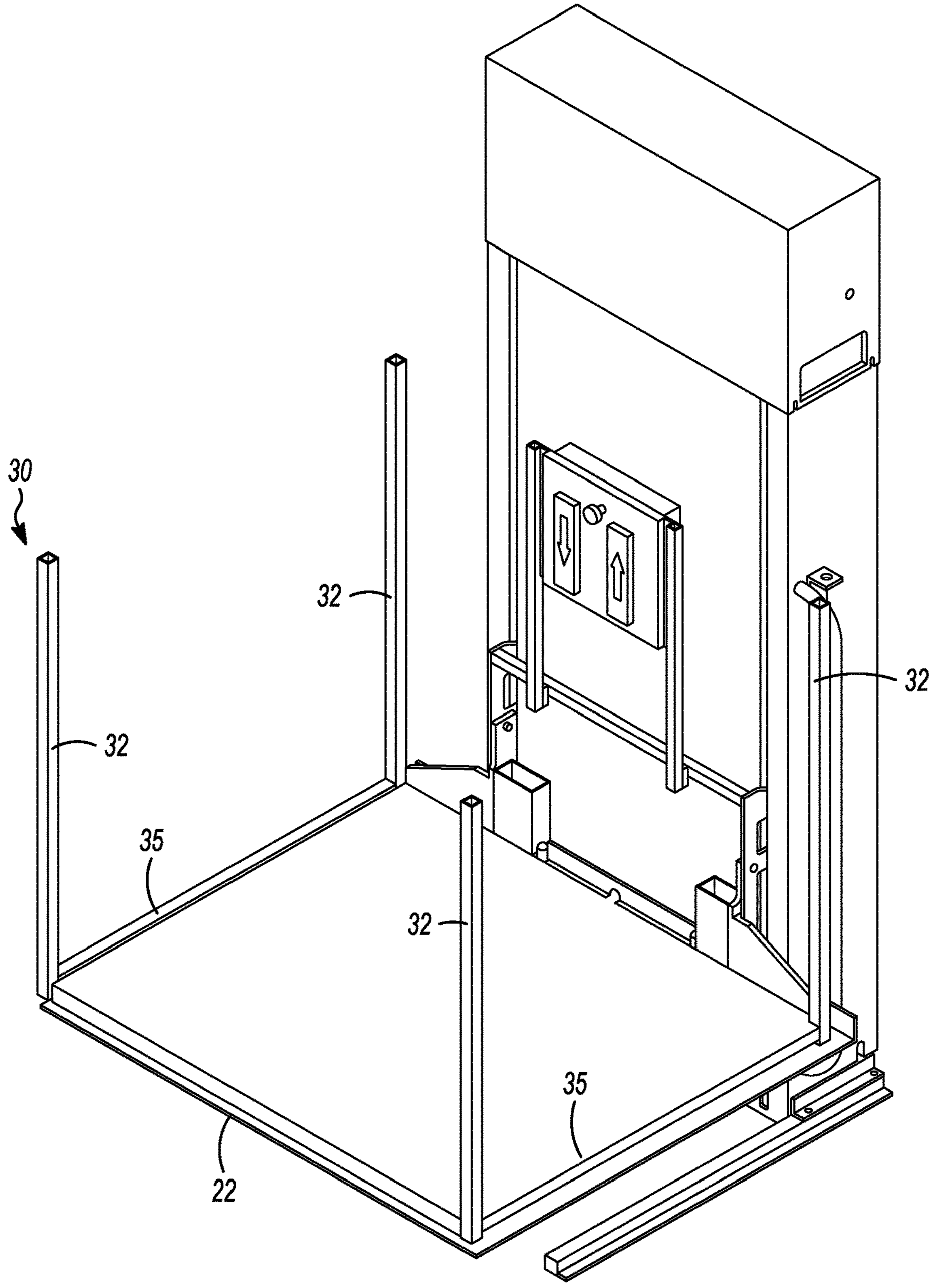
FIG. 2 is a view of the embodiment of FIG. 1 with two opposing platform extensions mounted.
Figure 3:
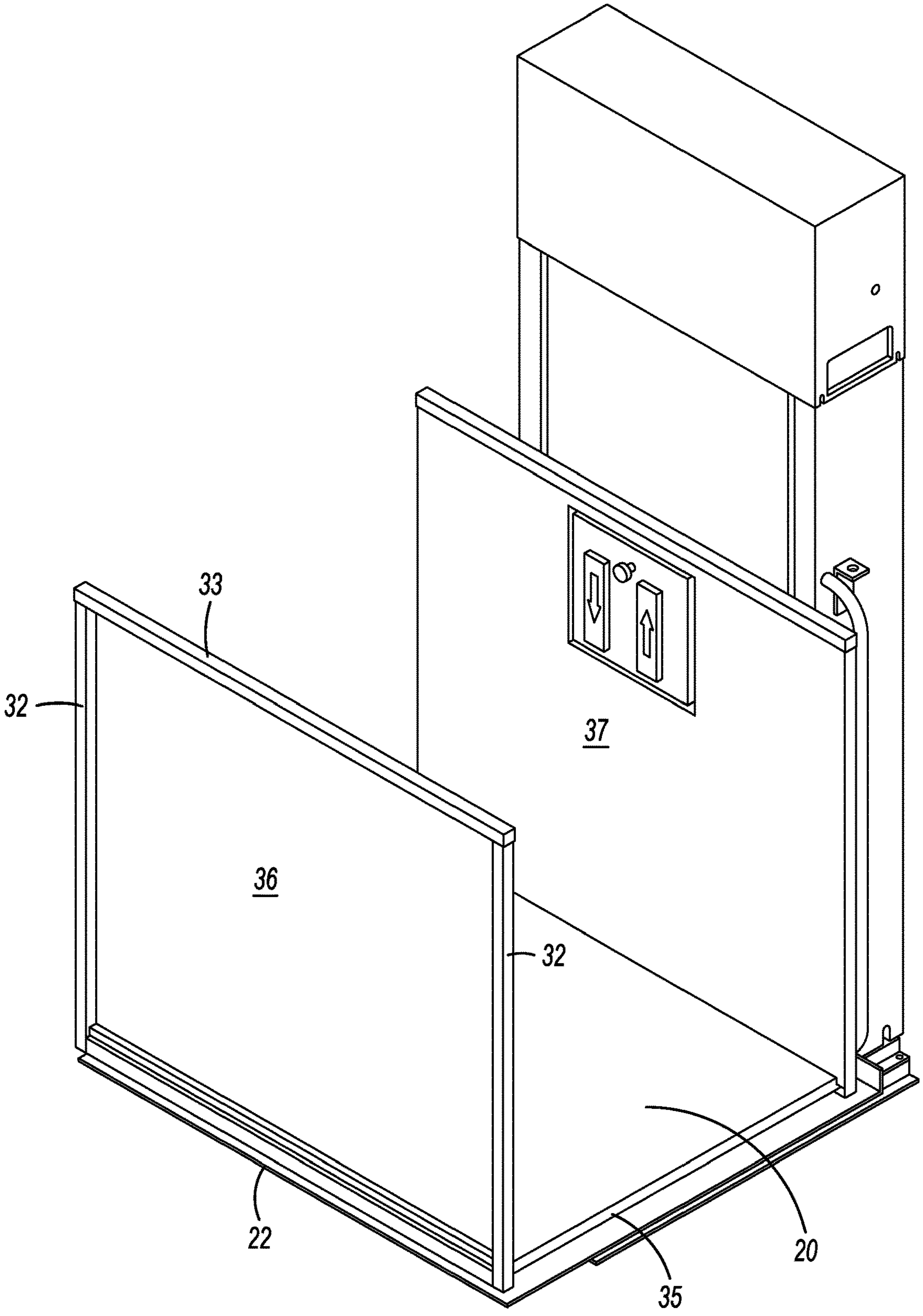
FIG. 3 is a view of the embodiment of FIG. 1 with vertical side wall plates mounted.

As may be seen in FIG. 2, a platform extension assembly 30 is installed across both the entrance side and the exit sides, in order to extend the base platform depth, and to provide support for the side wall which will span the opposite side 22, as shown in FIG. 3. As shown, a side wall 37 is also installed on the control wall side. The control side wall 37 may define a cutout to expose the control panel of the lift.

In some embodiments, the side walls 36 are pop riveted using aluminum rivets to the vertical posts 32. Aluminum rivets provide sufficient attachment strength, but may also be easily drilled out to remove the side wall 36. As will be appreciated by those skilled in the art, the attachment of the side wall 36 to opposing posts 32 which are bolted to the platform will have the requisite structural strength in the vertical and horizontal dimensions.

Optionally, a pivoting toe plate ramp 60 may be installed on the right or left lower level entrance side, which provides an entrance or exit ramp to the base platform 20 when lowered. When raised, the toe plate ramp 60 may provide a safety barrier, for example to prevent a wheelchair from rolling off the platform.

A safety tray is optionally included, and comprises, as is known in the art, a suspended tray 70 below the base platform 20 and which contacts a stop switch if it encounters an obstacle.

With a combination of different sized platform extensions and wall plates, a custom lift platform of a desired size and configuration may be installed. A wide variety of lift platform configuration kits maybe provided using combinations of different sized platform extensions. Thus, instead of manufacturing a custom lift platform for a particular installation, an installer may simply combine a base platform with the desired platform extensions to create the desired lift platform configuration.

Figure 4:
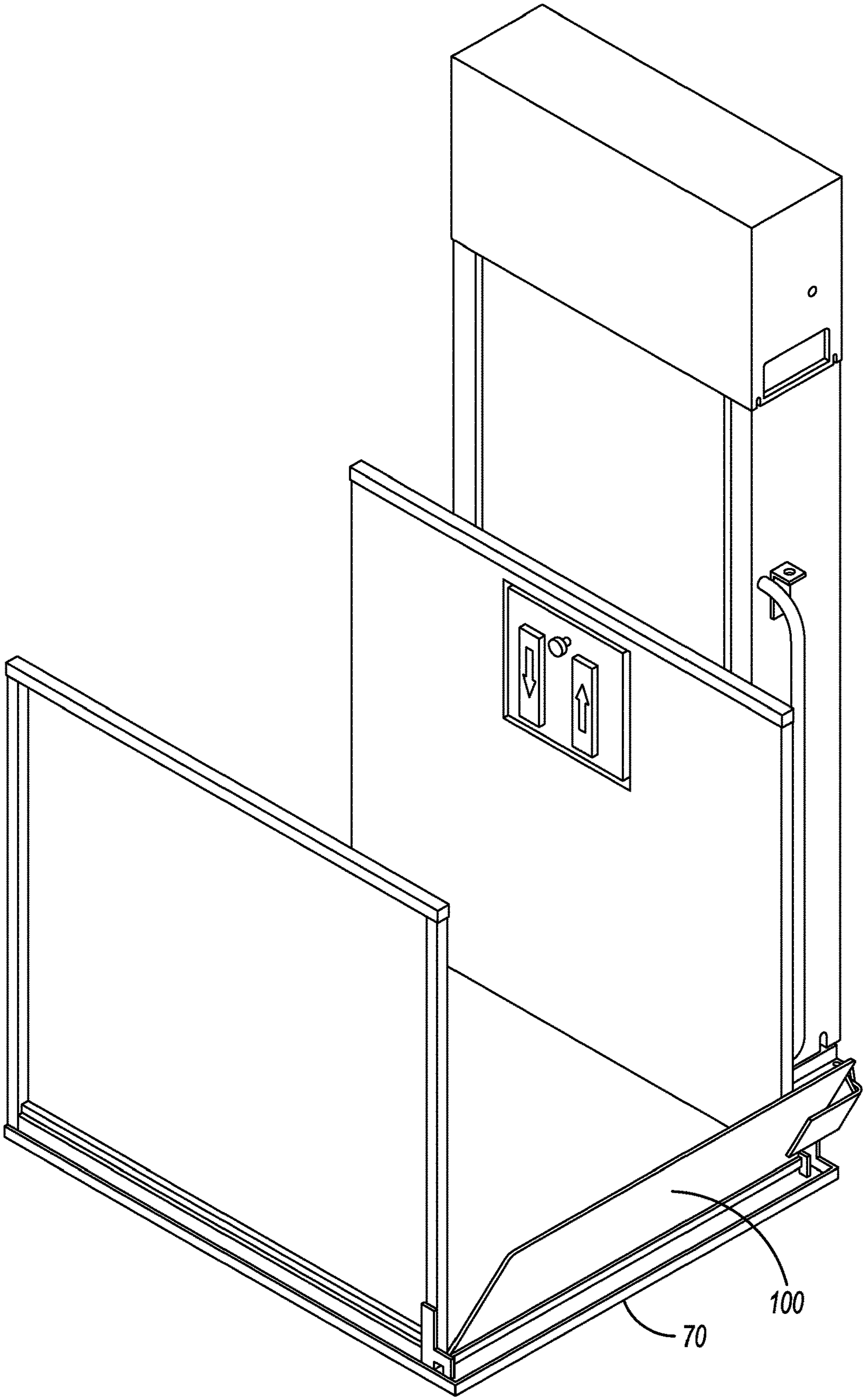
FIG. 4 is a view of the embodiment of FIG. 1 with a pivoting toe plate ramp mounted.
Figure 5A:
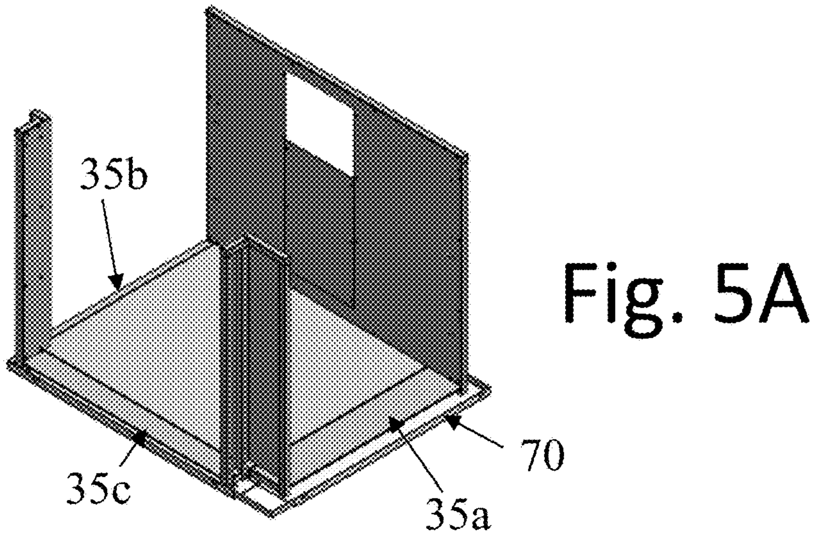
FIG. 5A is a view of the embodiment of FIG. 1, with a different configuration of platform extensions to produce a 42"×54' lift platform.
Figure 5B:
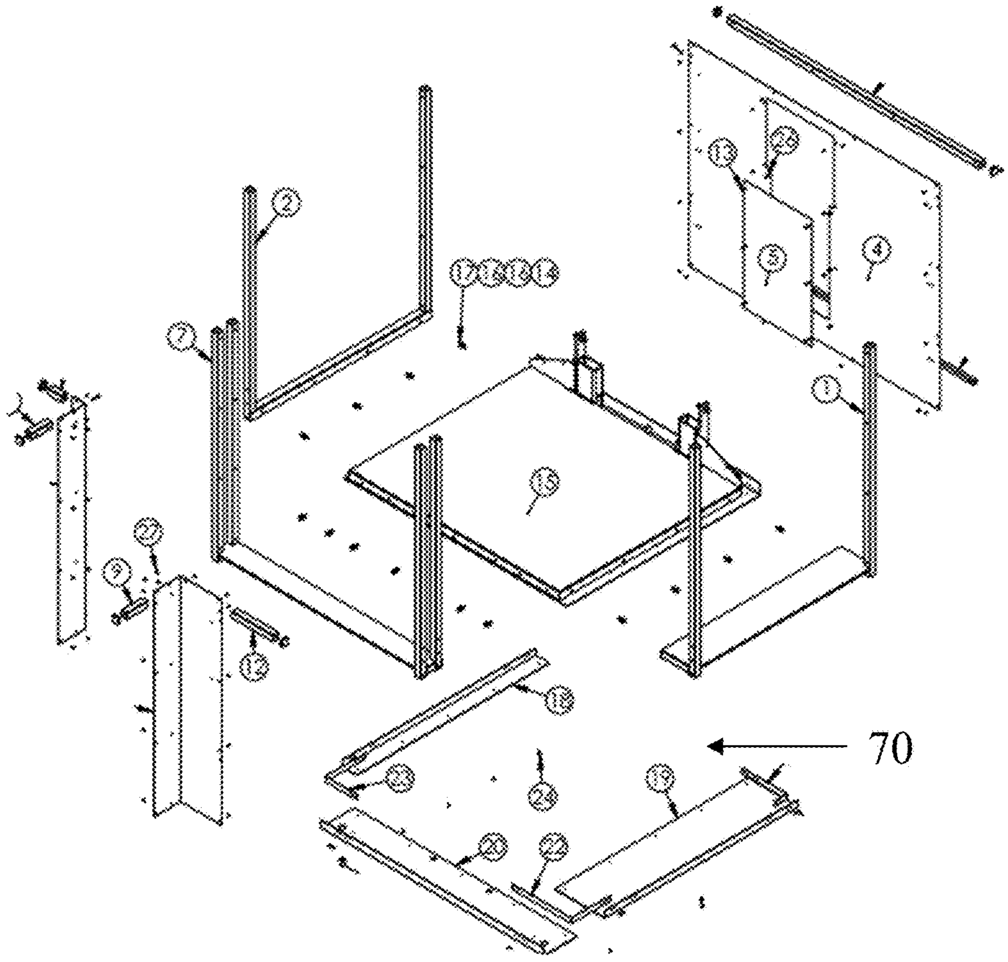
FIG. 5B is an exploded view of the base platform and the extension assemblies shown in FIG. 5A.
Figure 5C:
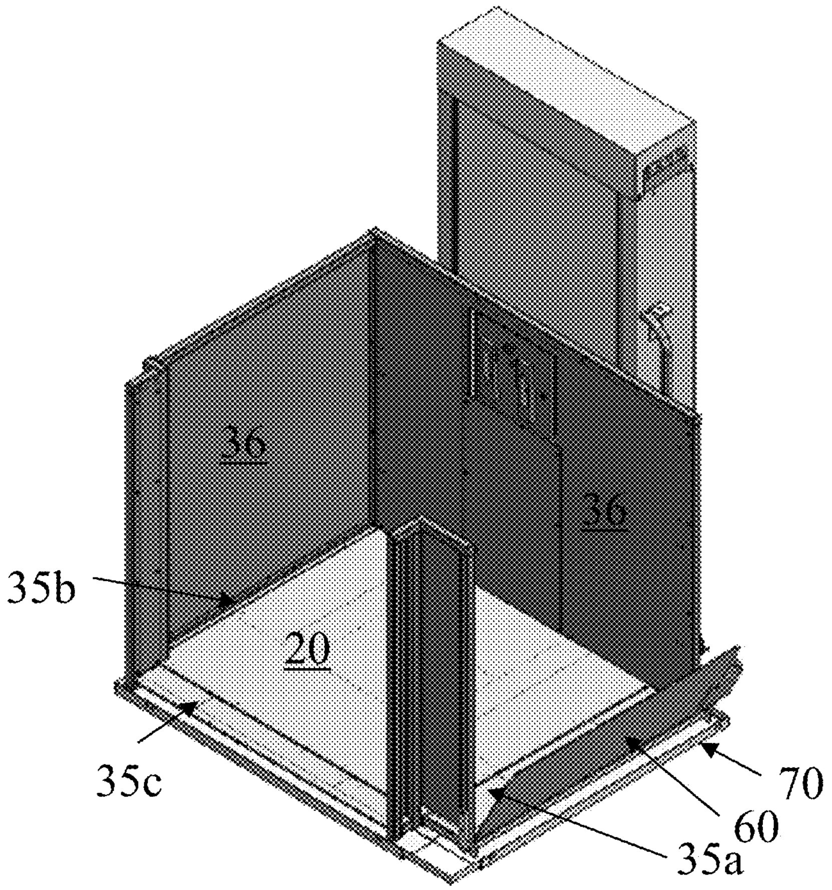
FIG. 5C is a view of the assembled platform shown in FIG. 5A with side walls, and with a right side ramp.

In one example, as shown in FIG. 4, a 36"×48", straight through, right side ramp is configured from a base platform of 36"×45", with no platform extension on the opposite side, and 1.5" platform extensions on both the left and right sides. As shown in FIGS. 5A-C, a lift platform having a width of 42" and a depth of 54" and with a left-turn path (right side ramp) can be created with the same base platform of 36"×45", a 7.5" extension plate 35*a* on the right side, and a 1.5" extension plate 35*b* on the left side, and a 6" extension plate 35*c* on opposite side. FIG. 5B shows a detailed exploded view of an exemplary embodiment, with the parts necessary to produce the customized lift assembly shown in FIG. 5C.

In one preferred embodiment, a base platform of 36'×45" and platform extension assemblies having 1.5", 6" and 7.5" widths may be installed in different combinations to produce the following configurations:

characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

TABLE 1

| | | | | | |
|---|---|---|---|---|---|
| 36 × 48 - Straight Thru - Right Side Ramp | 36 × 54 - Straight Thru - Right Side Ramp | 36 × 60 - Straight Thru - Right Side Ramp | 42 × 48 - 90 Degree - Right Side Ramp | 42 × 54 - 90 Degree - Right Side Ramp | 42 × 60 - 90 Degree - Right Side Ramp |
| 36 × 48 - Straight Thru - Left Side Ramp | 36 × 54 - Straight Thru - Left Side Ramp | 36 × 60 - Straight Thru - Left Side Ramp | 42 × 48 - 90 Degree - Left Side Ramp | 42 × 54 - 90 Degree - Left Side Ramp | 42 × 60 - 90 Degree - Left Side Ramp |
| 36 × 48 - Straight Thru - Enclosed Shaft | 36 × 54 - Straight Thru - Enclosed Shaft | 36 × 60 - Straight Thru - Enclosed Shaft | 42 × 48 - 90 Degree - Enclosed Shaft | 42 × 54 - 90 Degree - Enclosed Shaft | 42 × 60 - 90 Degree - Enclosed Shaft |
| 36 × 48 - Same Side Access - Enclosed Shaft | 36 × 54 - Same Side Access - Enclosed Shaft | 36 × 60 - Same Side Access - Enclosed Shaft | 42 × 48 - 3 Side Access - Enclosed Shaft | 42 × 54 - 3 Side Access - Enclosed Shaft | 42 × 60 - 3 Side Access - Enclosed Shaft |
| 42 × 48 - 3 Side Access - Right Side Ramp | 42 × 54 - 3 Side Access - Right Side Ramp | 42 × 60 - 3 Side Access - Right Side Ramp | 42 × 48 - 3 Side Access - Left Side Ramp | 42 × 54 - 3 Side Access - Left Side Ramp | 42 × 60 - 3 Side Access - Left Side Ramp |

As may be appreciated, a wide variety of different lift configurations may be installed by providing a single base platform and a small number of different platform extensions, which can be installed in different combinations to provide a lift of the desired configuration and size.

Interpretation

The forgoing description supplies specific details in order to provide a thorough understanding. Nevertheless, the skilled artisan would understand that the apparatuses, systems, and associated methods of using the apparatuses and systems can be implemented and used without employing these specific details. Indeed, the apparatuses, systems, and associated methods can be placed into practice by modifying the illustrated apparatus and associated methods and can be used in conjunction with any other apparatus and techniques conventionally used in the industry.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A modular lift system comprising:

(a) a lifting tower comprising a motor and drive components, for supporting, lifting and lowering a lift platform comprising a horizontal base platform having a width and a depth dimension defined along a horizontal plane, and comprising an area for supporting an object for lifting;

wherein the base platform has a control wall side, a side opposite the control wall side, and a left side and a right side, wherein the lifting tower is attached to the control wall side of the platform; and (b) at least two platform extension assemblies wherein each assembly comprises two vertical posts and a horizontal extension plate, the vertical posts extending upwardly from the horizontal extension plate;

wherein each extension assembly is configured to attach to one of the opposite side, left side and/or right side of the base platform, wherein, when attached, the horizontal extension plate of each extension assembly extends one or more of the width and depth dimensions of the area for supporting an object for lifting along the horizontal plane.

2. The modular lift system of claim 1, which comprises three platform extension assemblies.

3. The modular lift system of claim 1, wherein each platform extension assembly is a welded assembly.

4. The modular lift system of claim 1, further comprising a pivoting toe ramp for attachment to one extension assembly.

5. The modular lift system of claim 1 further comprising at least one side wall for installation on at least one of the opposite side, left side or right side, between vertical posts of adjacent or opposing platform extension assemblies.

6. A kit for assembling a lift platform having custom dimensions, comprising (a) a horizontal base platform having a control wall side, a side opposite the control wall side, and a left side and a right side, the base platform having a width and a depth dimension defined along a horizontal plane, and comprising area for supporting an object for lifting;

(b) a plurality of platform extension assemblies having different dimensions, wherein each platform extension assembly comprises two vertical posts and a horizontal extension plate and the vertical posts extend upwardly from the horizontal extension plate, and is configured to attach to one of the opposite side, left side and right side of the base platform to form the lift platform, wherein, when attached, the horizontal extension plate, of each platform extension assembly, extends one or more of the width and depth dimension of the area for supporting an object for lifting along the horizontal plane.

7. A method of assembling a lift platform of desired dimensions, comprising the steps of:

(a) providing a base platform having a depth and a width dimension defined along a horizontal plane, and comprising an area for supporting an object for lifting; and (b) selecting and installing at least two platform extension assemblies to the base platform, wherein each platform extension assembly comprises two vertical posts and a horizontal extension plate and the vertical posts extend upwardly from the horizontal extension plate, each platform extension assembly chosen from a plurality of platform extension assemblies having different dimensions for the horizontal extension plate, to increase the depth and/or width of the area for supporting an object for lifting along the horizontal plane to the desired dimensions.

* * * * *